Dec. 1, 1959     R. S. COFFMAN     2,915,216
SAFETY PRESSURE RELIEF DEVICE
Filed Nov. 23, 1956

ROBERT S. COFFMAN
*INVENTOR.*

BY *Jack R. Spriggate*
ATTORNEY

United States Patent Office 2,915,216
Patented Dec. 1, 1959

2,915,216

SAFETY PRESSURE RELIEF DEVICE

Robert S. Coffman, Kansas City, Mo., assignor to Black, Sivalls & Bryson, Inc., Kansas City, Mo., a corporation of Delaware Application November 23, 1956, Serial No. 624,030

1 Claim. (Cl. 220—89)

The present invention relates generally to safety pressure relief devices and more specifically to a releasable protective cover for a safety pressure relief device.

Many safety pressure relief devices are composed of a fitting which is threaded into a pressure system to be protected and a relatively thin rupturable diaphragm contained in the fitting. This diaphragm usually is sealed across the annular opening through the fitting and is sealed in position by solder or crimping. Many of these type fittings are used on pressure systems such as refrigeration systems for automobile air conditioning and are usually positioned near the automobile engine in the car. Thus, these devices are open to spray from the road, chat and gravel spray and other elements such as oil and salt which may be abundant on certain thoroughfares.

Also, on these units, since the rupture disc is so fragile, it has been found desirable to protect these discs from mishandling which they may receive from people, in particular, amateur mechanics and children who might mistake safety pressure relief devices for some other type of engine fitting. Therefore, the primary object of the present invention is to provide a safety pressure relief device with a protective cover which will protect the rupture disc of the device and will not disturb the predetermined rupture pressure of the rupture disc.

A further object of the present invention is to provide a releasable protective cover for a small fitting-type safety pressure relief device.

Another object of the present invention is to provide a protective cover for a fitting-type safety pressure relief device which is easily releasable to uncover the relief area of the device and which will remain securely attached to the device.

A still further object of the present invention is to provide a safety pressure relief device with a releasable protective cover having a surface on which the pressure rating of the relief device may be stamped.

In accomplishing these and other objects of the present invention, I have provided the accompanying drawings wherein.

Figure 1:
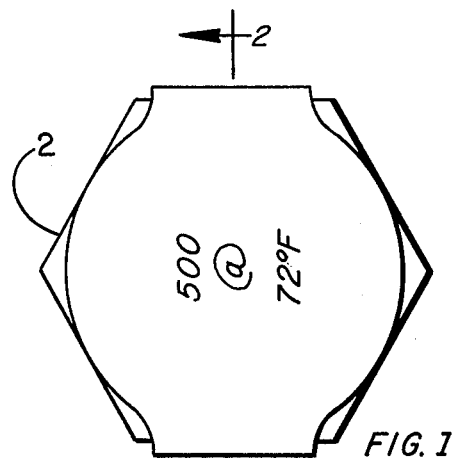
Fig. 1 is a plan view of a safety pressure relief device having a protective cover of the present invention.

Referring more in detail to the drawings:

The numeral 1 represents the body of the safety pressure relief device which has an upper hexagonal shape, designated 2, and a lower externally threaded connection 3. A lower bore 4 extends substantially through the hexagonal portion 2. Rupture disc 6 is secured within bore 5 in complete covering relationship thereto and is soldered therein by solder 7.

Figure 2:
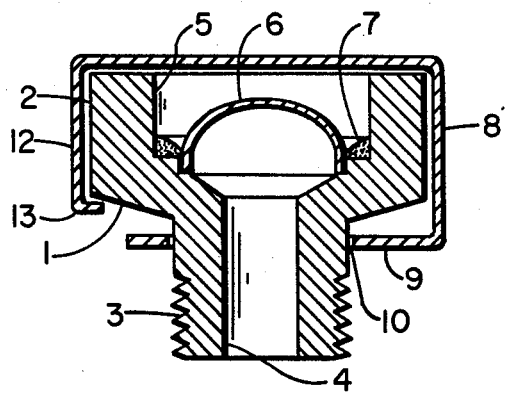
Fig. 2 is a sectional view taken along lines A—A of Fig. 1.
Figure 3:
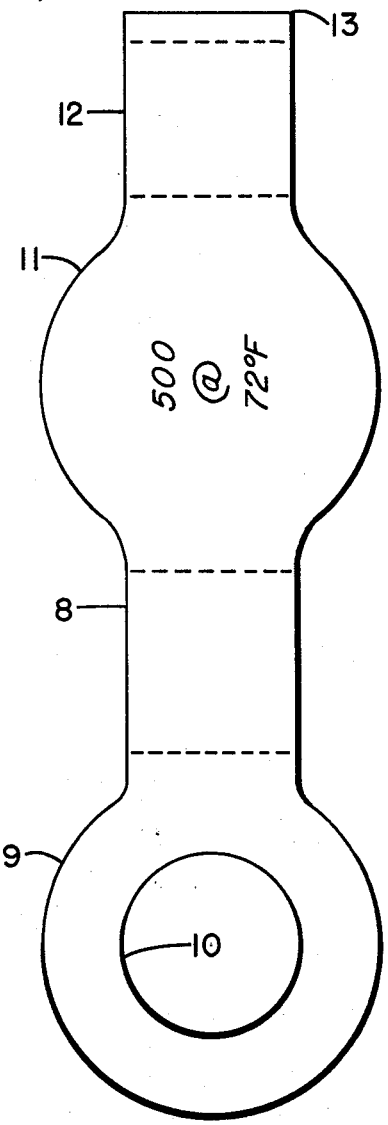
Fig. 3 is a layout view of the protective cover of the present invention.

Cover strip 8 is formed as best shown in Fig. 3 wherein one end thereof is rounded as at 9 having a hole 10 therethrough to be slipped onto the threaded portion 3 of device 1. Cover strip 8 is folded approximately as shown by the dotted lines in Fig. 3 and will assume the shape around device 1 as is best shown in Fig. 2. The covering portion 11 of cover 8 is positioned directly over the bore 5 to prevent any accidental contact with disc 6. It should be noted that end 12 is bent downwardly and the terminal portion 13 is bent inwardly as best shown in Fig. 2 to provide the means retaining cover 8 in position except when disc 6 has ruptured. It has been found that cover 8 will immediately release and uncover bore 5 upon the rupture of disc 6 thereby providing complete pressure relief of the unit.

As best shown in Figs. 1 and 3, portion 11 of cover 8 is shown to bear the pressure rating of safety pressure relief device 1. This feature has been found to be advantageous since the stamping of hexagonal portion 2 will normally affect the bursting pressure of the unit unless it is stamped prior to machining bore 5 therein. This is usually impractical since a single fitting may be used for a wide variety of bursting pressures merely by changing the thickness of rupture disc 6.

It should be noted that I have constructed my protective cover strip 8 of copper but that any material may be used which will have the desired flexibility to be formed to the proper shape and to release upon the rupture of disc 6. It is desirable also that cover strip 8 be made of metal to facilitate the stamping of the rated bursting pressure of device 1 thereon but it is contemplated that other materials may be used which have the desired properties and on which the rated bursting pressure may be permanently printed or otherwise affixed thereto. Caution should be taken to use a material and design which will allow cover 8 to release immediately to uncover bore 5 upon rupture of disc 6 but which will be wholly retained in connection with device 1 to prevent its being a missile powered by the gas pressure being relieved through device 1. Obviously, a flying fragment of cover strip 8 near an automotive engine could cause damage to sensitive parts of the engine, for example, the radiator.

As previously stated, it can be seen from the foregoing that I have provided a releasable protective cover for a safety pressure relief device which will protect the rupture unit of such device from all types of external damage without affecting the predetermined rupture pressure of such unit. Also, I have provided a novel protective cover for a safety pressure relief device which, upon rupture of the device, will open allowing complete opening of the relieving area of the device without releasing its permanent attachment to the device.

What I claim and desire to secure by Letters Patent is:

A safety pressure relief device comprising, a body member, said body member having one end externally threaded for installation into a pressure system to be protected and its other end formed to receive lever means for turning said body member, said other end of said body member being formed to have flat surfaces on its outer periphery and having shoulders with respect to said threaded end, a chamber in said other end of said body member for receiving a rupturable diaphragm, a bore extending through said threaded end of said body member and terminating in said chamber, a rupturable diaphragm secured in said chamber in covering relationship to said bore and a protection member positioned in covering relationship to said chamber, one end of said protection member being fixedly secured around said body member, the other end of said protection member being releasably secured to said body member by being bent under a portion of said shoulders of said flat surfaces to release and uncover said chamber when said rupturable diaphragm ruptures.

References Cited in the file of this patent

UNITED STATES PATENTS

| | | |
|---|---|---|
| 1,402,231 | Hooper | Jan. 3, 1922 |
| 1,415,216 | Bingay | May 9, 1922 |
| 1,579,141 | Pierce | Mar. 30, 1926 |
| 2,291,374 | Canfield | July 28, 1942 |
| 2,536,321 | Smith et al. | Jan. 2, 1951 |
| 2,548,744 | Simms | Apr. 10, 1951 |